United States Patent Office 3,520,703
Patented July 14, 1970

---

3,520,703
PROCESS FOR PRODUCING BREAD AND BAKING PRODUCTS
Friedrich Bayerlein and Winfried Kolbeck, Munich, Germany, assignors to Diamalt Aktiengesellschaft, Munich, Germany
No Drawing. Filed Oct. 16, 1967, Ser. No. 675,300
Claims priority, application Germany, Aug. 8, 1967, 1,642,542
Int. Cl. A21d 2/28
U.S. Cl. 99—91
11 Claims

ABSTRACT OF THE DISCLOSURE

A process for producing bread and baking products by the sour dough method essentially from flour, water, and yeast which is characterized by the addition of a reducing dough activator constituted by cysteine-N-carbamide in an amount between 0.001 to 0.02% relative to the quantity of flour.

---

BACKGROUND OF THE INVENTION

Field of the invention

The invention relates to a process for producing bread and bakery products according to the sour dough method, and particularly to an improvement in the dough preparation.

Description of the prior art

In the usual sour dough processes for making break, rolls and other bakery products, the fermentation is the decisive factor concerning quality. This fermentation, which lasts throughout all stages of dough preparation, determines the consistency and elasticity of the dough, as well as the granulation, structure and aroma of the baked product. Through complex, enzyme-controlled processes, the proteins and carbohydrates of the dough mix are transformed in such a manner, that optimum handling and baking properties are obtained. In gluten-rich flours, as they are primordially represented by flours of North American origin, this transformation of the gluten substance in the fermentation process is of quite particular importance.

The conventional fermentation processes, depending on the gluten content of the flour utilized, require comparatively long periods of time and have, therefore, a disadvantageous effect on the entire time schedule of the bakery. Thus, an abbreviation of this fermentation time while maintaining the desired quality, is of considerable advantage for the bakery operation.

It is known from Canadian Pat. 649,206 that certain additives to the mix of the dough are capable of appreciably accelerating the fermentation process without impairing the quality of the baked product. Practically, this abbreviation particularly affects the first stage of the dough preparation process, namely the mixing and blending of the dough ingredients until they attain a consistency suitable for further processing. Simultaneously with the abbreviation of the blending phase, a simplification of the blending procedure is obtained, since many dough preparation methods, which operate with a preliminary dough, such as the American "sponge dough" process for example, carry out the blending in several steps in order to improve the quality. While maintaining an at least equivalent quality, the additives above postulated as known, make a step-wise blending operation unnecessary. Suitable substances disclosed in the cited patent are cysteine, cysteine hydrochloride, glutathion as well as some salts of sulfurous acid. For obtaining optimum dough properties, an oxidation agent serving as a means for gas retention, such as a bromate, iodate, persulfate or the like must be worked into the dough mass in addition to the aforementioned activators. The utilization of these aids for dough preparation and baking has been known for quite some time.

The activation of the complex fermentation process for obtaining a desirable dough quality, whose chemical action has not been fully understood so far, appears to depend upon a specific property of certain structurally heterogenous compounds, from which no general postulates concerning the suitability of other compounds can be deduced.

Thus in a general manner, neither a certain reducing capability is sufficient, since for example such compounds as thiosulfite, hydrazine or ascorbate are useless, nor the combination of the reducing property with a thiol function. On the one hand, the desired effect is obtained by inorganic bisulfites free of thiol groups, and on the other hand, thioglycolic acid proves unsuitable for the desired purpose, although it carries a thiol function and although the reducing potentials of thioglycolic acid and cysteine are practically equal, and although the use of thioglycolic acid for the activation of certain enzyme systems such as cysteine is known. In fact, thioglycolic acid, similar to the effect of cysteine, abbreviates the blending time, however it does not produce the desired tensile properties of the dough.

From the above-mentioned efficacious compounds disclosed in the Canadian patent, the rather expensive tripeptide glutathione could hiterto not be considered for utilization for economical consideration, especially since, due to the higher molecular weight, the same activation can only be obtained by adding approximately twice as much glutathione as cysteine hydrochloride. On the other hand, the sulfurous acid salts appear questionable from a physiological point of view. Also, they require for optimum results, more substantial dosages of bromate, which again is not without objection from the physiological point of view. Under the circumstances, it is not surprising that practical interest has mainly concentrated around cysteine. The also active, free, neutral cysteine amino acid of the D-, L- and DL-series, however, according to the above-mentioned Canadian patent, is not suitable for practical utilization on account of its pronounced auto-oxidation tendency. In this highly air-sensitive reaction, cystin is produced very rapidly, which is inactive for the process considered. On account of this undesirable property of the neutral compound, only the highly acid cysteine hydrochloride, out of all compounds disclosed in the Canadian patent, possesses practical importance, especially since it also offers economical advantages over cysteine. However, even cysteine hydrochloride presents considerable disadvantages for the described process and technical difficulties of application.

In dry state, cysteine hydrochloride is actually a number of times more stable than free cysteine. But it owes this increased stability against auto-oxidation only to its higher acidity. A 10% aqueous solution of cysteine hydrochloride shows a pH-value of approximately 1.5. However, the auto-oxidation of cysteine is highly pH-dependent. The maximum proclivity for auto-oxidation lies in the neutral range between pH 5 and 9. As soon as cysteine hydrochloride is fully neutralized in an aqueous, or even a heterogenous solid phase, there will occur free cysteine with the aforementioned tendency for auto-oxidation.

In the known process, cysteine hydrochloride is added to the dough mix in proportion of 0.002% to 0.02% of the flour ingredient, or 0.003% to 0.03% of the water quantity used. The pH value of the diluted, aqueous solutions lies very close to the dangerous auto-oxidation range. The proteins present in the dough mix in considerable quantity also act as buffers, so that in the practical operation of the described process, the pH value will actually lie within the neutral range favoring the auto-oxidation of the cysteine.

The conditions are not very different, if the cysteine is pre-mixed with spray-dehydrated milk solids or dry skim milk in a concentration of 0.033% to 1.25%. The proteins available in the dry product in considerable excess, buffer off the hydrochloric acid linked to the cysteine, so that neutral cysteine is actually available in the mixture. Especially during prolonged or improper storage, auto-oxidation to cystine may easily occur with corresponding loss of active capability.

According to the aforementioned Canadian patent, this auto-oxidation proclivity also becomes quite apparent in the use of cysteine hydrochloride, if one attempts to effect the admixture of the activator and the carrier material in the wet state: It is necesary, then, to add an increased dosage of cysteine hydrochloride in order to compensate for the losses due to oxidation from the air.

A further property of the dry hydrochloride, which is disadvantageous for the described process, is its pronounced hygroscopicity, which increases with increasing fineness of the product. However, the product must be ground down very fine for utilization in the process described in the Canadian patent, in order to assure the greatest possible homogeneity between the solid activator (cysteine hydrochloride) and the likewise solid carrier material (dehydrated whey) for the eventual pre-mixing operation. This finely powdered cysteine hydrochloride tends to form lumps on account of its increased hygroscopicity, and thus causes considerable difficulty for homogenous blending of the activator with the carrier substance, e.g. whey. This lacking of homogeneity becomes particularly difficult if and when it is intended, according to the known process, to incorporate simultaneously in the carrier material, an oxidation agent such as a bromate, or equivalent compound, which is required as a means for gas retention. In this circumstance, the danger of a reciprocal interaction causing the formation of inactive products is particularly likely.

It has also been proposed, in order to prevent the reciprocal interaction between reducing and oxidating agents simultaneously worked into the carrier substance, to coat the active substances with water-soluble polymers, such as gelatin, carboxymethylcellulose or plant rubber.

Numerous objectionable properties of cysteine hydrochloride mitigate against its direct utilization in pure state in the bakery operation, in accordance with the Canadian patent. Apart from its auto-oxidation tendencies, cysteine hydrochloride, on account of its high acidity, is an aggressive, highly mucus irritating substance. The hygroscopic properties of the compound tend to cause storage and transportation difficulties. And once the material has absorbed any humidity, it easily forms crusts and retains only very limited storage life.

SUMMARY OF THE INVENTION

In accordance with the description hereinabove of the prior art, it becomes evident that there was a need for a substance, specifically capable of activating the processes of dough preparation in the required manner, in order to produce optimum properties of the dough and consequently the best possible baked products. Additionally, this substance had to be easily handled, economical, non-hygroscopic, non-toxic and non-aggressive, and finally, had to possess the highest possible degree of stability against spontaneous oxidation from atmospheric oxygen even when in dilute solutions at neutral pH value.

It was found that the preparation of fermented doughs, especially yeast doughs, for the production of commercial bakery products, can be considerably improved, by adding cysteine-N-carbamide to the dough mix.

The object of the present invention is thus to provide a process for producing bread and bakery products by the souf dough method essentially from flour, water and yeast. The invention is characterized by adding cysteine-N-carbamide to the dough as an activator.

The cysteine-N-carbamide compound according to the invention, preferably is L-cysteine-N-carbamide. Additionally, also the N-carbamides of D- and DL-cysteine are suitable. Also included in the invention are the alkali and alkaline earth salts of cysteine-N-carbamide. Also, the primary amide nitrogen in the cysteine-N-carbamide may be substituted by alkyl or aryl radicals.

For obtaining optimum dough properties, an oxidation active substance is favorable for carbon dioxide retention. As when using cysteine hydrochloride, bromate, iodate and persulfate salts are suitable for this purpose, as well as chlordioxide and benzylperoxide.

By the addition of 0.001 to 0.02% of cysteine-N-carbamide (relative to the flour quantity) to the dough mix, the blending time for obtaining a suitably consistent dough is reduced by 75% compared to conventional processes. Combined with an ingredient of 0.002% to 0.008% (again referred to the flour quantity used) of one of the aforementioned gas-retaining agents, the dough mass obtained within the considerably abbreviated time, showed perfect elasticity (ductility). The resulting bread quality, as compared to commercially available bread, was excellent with regard to circumferential size, granulation, structure and aroma. In comparison to bread loaves, which had been produced with the addition of cysteine hydrochloride, a higher yield of the bread produced with cysteine-N-carbamide was noted, since comparable bread volumes could be produced with considerably smaller additions of cysteine-N-carbamide. Thus, cysteine-N-carbamide is superior to cysteine hydrochloride in its activating capability, without possessing the disadvantages of the last named compound.

This favorable action of the cysteine-N-carbamide could not be foreseen due to the acknowledged high specificity of the requirements which the complex fermentation process imposes on a suitable activator, and since the introduction of the covalently linked substituent considerably modifies the chemical properties of the cysteine-N-carbamide, as compared to the basic substance.

Thus, there is a decisive difference in the sensitivity of both compounds to the influence of oxidating agents. Cysteine-N-carbamide proves to be much more stable than cysteine against spontaneous oxidation with atmospheric oxygen. This enhanced stability of cysteine-N-carbamide versus that of its basic substance exists over the entire pH range, and becomes particularly apparent in the physiological, neutral-pH range. It can be conjectured, that a specific interaction between the sulfur atom with the carbonyl group of the carbamide function is the cause of this special stability. In contrast with cysteine hydrochloride, the typical carbamide structure is not modified by pH value shifts, but the fact that the suspected interaction between the sulfur atom and the carbonyl function is eventually favored by rising pH values, may furnish a plausible explanation of the observed conditions. The very fact of this increased stability of cysteine-N-carbamide against oxidation influence, make it all the more suprising, that cysteine-N-carbamide exercises an analogous activating influence like cysteine hydrochloride. As recognized, this activation consists of a highly specific reducing process, and an increased oxidation stability should necessarily be accompanied by a small reducing capability.

In addition to the greater stability spontaneous oxidation, cysteine-N-carbamide possesses a further decisive advantage, in that in contrast to cysteine hydrochloride, it does not show any hygroscopicity.

Both factors contribute to an almost unlimited storage life of the compound, without necessity for any particular storage precautions. Consequently, there are no transportation difficulties at all from a practical point of view.

The decisive advantages of these two properties, however, lie in the application of the substance, which may consist of dry or wet pre-mixing with a carrier material intended as a dough ingredient, or of direct blending with the totality of the ingredients of the dough mix. The total absence of hygroscopicity of the material permits a maximum possible homogenization in dry pre-mixing with a desired carrier substance. Even the finest particles of the compound show no tendency to form lumps and can be processed without the slightest difficulty.

When wet-blending the activator according to the invention into a carrier substance, no appreciable losses of active substance due to oxidation from the atmosphere are encountered, in contrast with cysteine hydrochloride, due to the high oxidation stability of cysteine-N-carbamide. Thus, according to the process of the invention, the highest possible homogenous distribution of the activator in the carrier substance is obtained.

On account of its higher stability against oxidating agents, the substance according to the invention also proves superior to cysteine hydrochloride in the case, where an activating reducing agent and the oxidating agent needed for gas retention are simultaneously blended in dry state into one and the same carrier substance. Also in this case, on account of the considerably reduced possiblity of reciprocal interaction, which is further removed by the described capability of homogenization within the carrier substance, any danger of loss of active capability is considerably minimized.

Finally, for direct blending into the complete dough mix, cysteine-N-carbamide is also immensely superior to cysteine hydrochloride, which is hard to handle in the bakery operation on account of its aggressive property and its hygroscopicity, especially when this includes the supplying of measured quantities from an economical large-scale storage mass, whenever the new dough mix has to be prepared.

On the contrary, cysteine-N-carbamide is a non-aggressive, limitlessly storable, completely harmless-to-handle compound, devoid of hygroscopicity, which offers no difficulty whatsoever to its direct utilization in the operation of a bakery.

A thus facilitated direct working method also completely avoids the risk which exists in the pre-mixing of oxidation and reducing agents concerning a loss of active capability due to reciprocal interaction of both active substances, which occurs particularly with cysteine hydrochloride.

A further advantage of the compound of the invention is its economy. Regardless of the fact that the simplified handling contributes to avoidance of losses, the compound according to the invention can be produced with nearly full quantitative yield simply and economically according to known processes, such as that in German patent application No. D 48,855 IVb/120.

DESCRIPTION OF THE PREFERRED EMBODIMENTS OF THE INVENTION

The invention will next be described in greater detail with reference to the following examples wherein the parts mentioned are, unless otherwise stated, parts by weight.

Example I.—To the basic dough recipe of

| | Parts |
|---|---|
| Manitoba flour | 1000 |
| Sugar | 40 |
| Homogenized full fat | 30 |
| Salt | 20 |
| Yeast | 25 |
| Malt extract | 7.5 |
| Sweet whey | 50 |
| Water | 700 | addition was made of

| | |
|---|---|
| L-cysteine-N-carbamide | 0.05 |
| Potassium bromate | 0.05 |

The mix was manually pre-blended, thereafter blended for 1 minute in an arm type "Diosna" blender at slow speed, and subsequently in a "Libbelle" stirrer type mixer for 4 minutes at higher speed.

The resulting dough (yield 1850 parts), was divided into loaves of 435 parts each, and these were left at rest for 30 or 60 minutes respectively at 30° C. (dough temperature). After this rest period, the loaves were pre-formed, subjected to 10 minutes of intermediate fermentation, and then, after final shaping subjected to 60 minutes of fermentation at 35° C. Thereafter the loaves were baked for 25 minutes at 235° C.

The ductility of the dough after blending and the loaf volume of the baked breads from dough mixes containing L-cysteine-N-carbamide/potassium bromate, were compared to corresponding conventional products without these additives.

Whereas the dough mixes without L-cysteine-N-carbamide/potassium bromate continued to be very stiff after blending and could be further processed only with great difficulty, the doughs with L-cysteine-N-carbamide after the indicated periods showed excellent formability and were excellently suited for further processing.

The loaf circumference of the doughs left to rest for 30 minutes rose from 620 volume parts without additives to 690 volume parts with addition (relative measurement) of L-cysteine-N-carbamide and potassium bromate.

For doughs with a 60 minute rest period, an increase of the loaf volume was obtained from 690 volume parts without additives to 910 volume parts with addition (relative measurement) of L-cysteine-N-carbamide and potassium bromate.

The quality and porosity of the loaves obtained with L-cysteine-N-carbamide were noticeably better than those of the loaves made without additives.

Example II.—A basic dough mix was prepared which was identical to that in Example I, except that the dry whey had previously been admixed with 0.1% of L-cysteine-N-carbamide by weight.

As in Example I the ductility of the dough was excellently suited for further processing.

After 60 minutes rest time for the dough, the relative bread volume rose from 435 parts of dough to 990 volume parts in comparison to Example I.

Example III.—The dough mixes were prepared according to Example I, except that with the 0.05 part of potassium bromate only 0.02 part of L-cysteine-N-carbamide were added. With a dough rest time of 60 minutes in each case, the ductility of the dough after mixing, was comparable to that of the dough mixes with 0.05 part of L-cysteine-N-carbamide. The relative loaf volume based on 250 parts of dough was found to be 1000 volume parts. Compared hereto, the loaf volume from corresponding dough quantities with addition of 0.05 parts L-cysteine-N-carbamide and 0.05 part potassium bromate was 990 volume parts.

What is claimed is:

1. A process for producing bread and bakery products by the sour dough method, essentially from flour, water and yeast with the addition of a reducing dough activator, said process comprising adding cysteine-N-carbamide to the dough as the dough activator in an amount of 0.001 to 0.02% relative to the quantity of flour.

2. A process according to claim 1 wherein said cysteine-N-carbamide is L-cysteine-N-carbamide.

3. A process according to claim 1 wherein the cysteine-N-carbamide is added in an amount of 0.002 to 0.01% relative to the quantity of flour used.

4. A process according to claim 1 wherein the cysteine-N-carbamide is directly added into the substance of the complete dough mix.

5. A process according to claim 1 wherein the cysteine-N-carbamide, prior to its addition to the dough mix, is blended with another ingredient of the dough mix as a carrier material.

6. A process according to claim 5 wherein the other said ingredient of the dough mix to which the cysteine-N-carbamide is added is skim milk or whey.

7. A process according to claim 5 further comprising homogenizing the cysteine-N-carbamide in dry state with a dry carrier material.

8. A process according to claim 5 wherein the preliminary blending of the cysteine-N-carbamide with the carrier material is effected in aqueous solution, suspension or emulsion, whereafter the resulting homogenous blend is dried and the thus obtained dried mixture then added to the dough preparation.

9. A process according to claim 1 comprising the further addition to the dough mix, simultaneously with the cysteine-N-carbamide, of a gas retention agent in an amount between 0.002 to 0.008% of the quantity of flour.

10. A process according to claim 9 wherein the gas retention agent is a bromate, iodate or persulfate salt.

11. A dough for the production of bread and bakery wares consisting essentially of flour, water and yeast, and 0.001 to 0.02% of cysteine-N-carbamide relative to the quantity of flour.

References Cited
UNITED STATES PATENTS 3,053,666  9/1962  Henika et al. _____ 99—90

LIONEL M. SHAPIRO, Primary Examiner

J. R. HOFFMAN, Assistant Examiner